United States Patent [19]

Slocum et al.

[11] Patent Number: 4,987,526
[45] Date of Patent: Jan. 22, 1991

[54] SYSTEM TO PROVIDE HIGH SPEED, HIGH ACCURACY MOTION

[75] Inventors: Alexander H. Slocum; Debra Thurston, both of McLean, Va.

[73] Assignee: Massachusetts Institute of Technology, Cambridge, Mass.

[21] Appl. No.: 305,741

[22] Filed: Feb. 2, 1989

[51] Int. Cl.$^5$ ............................................. G05B 19/19
[52] U.S. Cl. ............................... 364/167.01; 310/330; 250/442.1
[58] Field of Search ............... 364/167.01, 182, 474.35, 364/174, 508; 101/93.05; 400/320, 328, 333; 356/345; 250/442.1; 310/75 D, 90.5, 328, 330, 14, 51, 318; 318/594, 630, 135, 632; 346/139 R

[56] References Cited

U.S. PATENT DOCUMENTS

| | | | |
|---|---|---|---|
| 4,084,681 | 4/1978 | Heinzl et al. | 400/328 |
| 4,244,629 | 1/1981 | Habermann | 308/10 |
| 4,270,868 | 6/1981 | Morgan et al. | 400/320 |
| 4,338,035 | 7/1982 | Kondo et al. | 400/320 |
| 4,343,993 | 8/1982 | Binnig | 250/306 |
| 4,365,301 | 12/1982 | Arnold et al. | 364/474.28 |
| 4,461,984 | 7/1984 | Whitaker et al. | 318/640 |
| 4,504,158 | 3/1985 | Ciampi et al. | 400/320 |
| 4,520,570 | 6/1985 | Bednorz | 33/180 R |
| 4,539,905 | 9/1985 | Zenner | 400/320 |
| 4,541,747 | 9/1985 | Imaizumi et al. | 400/320 |
| 4,573,363 | 3/1986 | Shin | 400/320 |
| 4,577,131 | 3/1986 | Soobitsky | 310/328 |
| 4,590,380 | 5/1986 | Tamaki | 250/442.1 |
| 4,628,441 | 12/1986 | Johnstone et al. | 364/474.35 |
| 4,684,315 | 8/1987 | Sugishima | 414/749 |
| 4,689,491 | 8/1987 | Lindow | 250/572 |
| 4,724,318 | 2/1988 | Binning | 250/306 |
| 4,832,518 | 5/1989 | Moriyama | 400/328 |

Primary Examiner—Jerry Smith
Assistant Examiner—Paul Gordon
Attorney, Agent, or Firm—Bromberg & Sunstein

[57] ABSTRACT

A system for moving an object to a desired position quickly, but while minimizing oscillations, using an actuator and a flexural transmission. The system measures to positions of the object and the actutator, and then determines the differences between these positions and the desired final positions. This information is used to determine when and how much the actuator should jerk back on the object. The flexural transmission can include a tensioned wire that is oriented in the direction of movement of the item.

21 Claims, 9 Drawing Sheets

SYSTEM TO PROVIDE HIGH SPEED, HIGH ACCURACY MOTION

The Government has rights in this invention pursuant to grant No. 60NANB7D0725 awarded by the National Bureau of Standards.

DESCRIPTION

1. Field of the Invention

The present invention relates to mechanisms that require one or all of the following characteristics: high accuracy, high speed, large range of error free motion. The predominant application is for linear motion devices such as instrument carriages or high speed, high resolution printer carriages, but other applications, such as rotary motion, are also envisioned.

2. Background of the Invention

Perhaps the most difficult task in designing and building a precision high speed, high accuracy machine or instrument is accounting for misalignment of actuators and bearings and the flexibility of the coupling device between the actuator and the carriage. Specifically, coupling a linear actuator to a linear bearing so as to not induce wear and error into the system can often be achieved only via the use of hand finishing operations, error mapping and software, coarse-fine actuation systems, or kinematic transmission elements.

Hand finishing operations (e.g. scraping) have traditionally been employed to make sure that an actuator such as a leadscrew is parallel to an axis of motion and that the leadscrew nut flange bolts to the slide without imposing any stresses on the system. Hand lapping has also enabled instruments with sliding tables to be developed with resolution on the order of Angstroms. Hand finishing operations are also the key to successful manufacture of diamond turning machines which are critical to the manufacture of many optical components, computer memory disks, and precision scientific instruments. However, hand finishing techniques are difficult to employ on a large production basis because of an increasing lack of skilled craftsmen.

An alternative to hand finishing operations is to place strict tolerances on machined parts so during assembly the actuator (e.g. leadscrew) will be aligned with the axis of motion.

Regardless of the technique used to manufacture a machine, software based error mapping and compensation techniques can be used to increase accuracy to the level of repeatability as discussed in "A General Methodology for Machine Tool Accuracy Enhancement Theory, Application and Implementation" by M. Donmez (Ph.D. Thesis, Purdue University, August 1985.) However, these techniques can only compensate for "so many parts per million" of error and thus are most effective when applied to machines that have already been made mechanically as good as possible. In addition, any errors due to deformation of components caused by forced geometric congruence can change with time due to wear. Thus machines whose errors are compensated for with software based error correction techniques may have to be periodically re-mapped.

Cost and difficulty of attainment of accuracy is often proportional to the "parts per million" accuracy required. Thus coarse-fine (macro-micro) systems have evolved. This type of system uses a stage manufactured with conventional precision grinding techniques and a flexural bearing fine motion stage to correct for errors. Extensive work has been done on these types of systems, and they are frequently used in wafer steppers for manufacture of integrated circuits, for example, GCA Corporation's DSW wafer stepper. In different configurations they have also found application in robotics and experimentally as "fast tool servos" for single axis final positioning of diamond tools.

A coarse-fine system is a proven approach that compensates for errors in one system by actively servoing them out using another system. Coarse-fine systems typically use for a coarse motion system a leadscrew or rack and pinion driven stage supported by rolling or sliding element bearings. The fine motion stage is usually supported by flexural bearings and actuated with microhydraulics, voice coils, or piezoelectronics. The principal problems with coarse fine systems, however, are the complexity of the mechanical design, difficulty in design and implementation of control algorithms, and the need for additional multiple sensors and servo-control hardware.

A kinematic transmission prevents non-axial motion components of the actuator from causing any motion of the carriage An added benefit is they often help to reduce the amount of heat transferred between the actuator to the slide. A kinematic transmission system is thus one in which only one degree of freedom between the actuator and the bearing supported slide is restrained. A kinematic transmission system filters out error motions by allowing members to slide or deflect in non-sensitive directions. There are two categories of kinematic transmission elements, active and passive, but they do not necessarily address the issue of maintaining high axial stiffness for minimal cost.

Active kinematic transmissions have sliding members and can achieve a true kinematic condition so only an axial force is transmitted through them. There are several types of active kinematic transmission elements The most common type of active kinematic transmission is the paddle type. The actuator is directly connected to a slave carriage which has a "U" shaped yoke attached to it. A paddle attached to the master carriage fits into the "U". Circular pad thrust bearings, which cannot resist lateral or angular motions, cause the paddle to remain axially centered in the yoke. In this manner only axial forces are transmitted from the slave to the master carriage. High axial stiffness is attained but at the expense of an added carriage and a hydrostatic bearing.

Flexural kinematic transmissions have members that easily elastically deform in order to accommodate error motions while being relatively rigid along the direction of the carriage's axial motion. Hence they are actually only quasi-kinematic and are thus referred to as just flexural couplings There are numerous types of flexural couplings that can act as effective kinematic transmission elements. Unfortunately, providing compliance in the direction of error motions typically leads to a stiffness in the axial direction that is far less than if the actuator were coupled to the carriage rigidly or through a paddle type element. As a result, a machine built with flexural couplings will typically have a slower response time which can lead to decreased productivity and inability to servo out noise inputs. There are different types of flexural couplings that provide varying degrees of coupling action (i.e. axes of compliance). Examples include the membrane and beam type elements shown in FIGS. 1 and 2 respectively.

In FIG. 1, a thin steel membrane 11 couples a base 12 for mounting to the carriage (or slide) and an actuator attachment bar 13. Arrow 11 indicates the direction of axial motion.

In FIG. 2, a beam 23, which can provide a surface for traction drive rollers attached to the carriage or slide, is connected by means of a hourglass-shaped flexural connection 21 to a first block 22, which is attached to the machine frame. The beam 23 is also connected by means of an end support spring 24 to a second block 25, which is attached to the machine frame. Arrow 26 indicates the direction of relative axial motion.

Typical prior art devices that use flexural couplings for accurately moving items controlled the movement of the item by measuring the position of the item and feeding the information regarding the position of the item into a feedback control system that adjusted the position or speed of the actuator that was supplying the force to the item through the flexural coupling.

SUMMARY OF THE INVENTION

The present invention provides a device for moving an item quickly and accurately. The invention includes a carriage for holding the item and an actuator for applying a force to move the carriage.

The invention also includes a sensor for measuring the position of the carriage and another sensor for measuring the position of the actuator. The invention further includes a control device, e.g. a computer, for receiving data from the two aforementioned sensors and for controlling the actuator such that the carriage is moved quickly and accurately to a desired position.

The invention also includes a flexural coupling, through which the force is transmitted from the actuator to the carriage. Although in a preferred embodiment a wire is used, a wide variety of flexural couplings can be used. (Indeed, every coupling device has some amount of flexibility, and even a relatively rigid coupling can be used in the invention. One would use such an embodiment of the invention, with a relatively rigid—but nevertheless flexural—coupling, if a more flexural coupling was impractical or not needed, and if one desired quick and accurate placement of the item.)

In a preferred embodiment of the invention, the flexural coupling is, at least in part, a wire that is taut enough to prevent backlash, but loose enough to absorb a substantial portion of lateral forces on the wire.

In one embodiment using the wire-type coupling, the wire is attached at two points to the carriage such that the wire is straight, and the actuator is attached to the wire at a third point between the two points.

In another embodiment using the wire-type coupling, the wire is looped around two pulley wheels, and the carriage is attached to the wire between the two pulley wheels such that when one of the pulley wheels is turned, the carriage means is moved in a direction parallel to the wire. One of the pulley wheels and a motor attached to the wheel are parts of the actuator. This embodiment can be used in a high-accuracy printer where the print head would be mounted on the carriage.

BRIEF DESCRIPTION OF THE DRAWINGS

These and other features of the invention will be more readily apparent in the following discussion, taken with the accompanying drawings, in which:

FIG. 10 shows the response of a system using the control algorithm shown in FIG. 7a.

DETAILED DESCRIPTION OF SPECIFIC EMBODIMENTS

Figure 1:
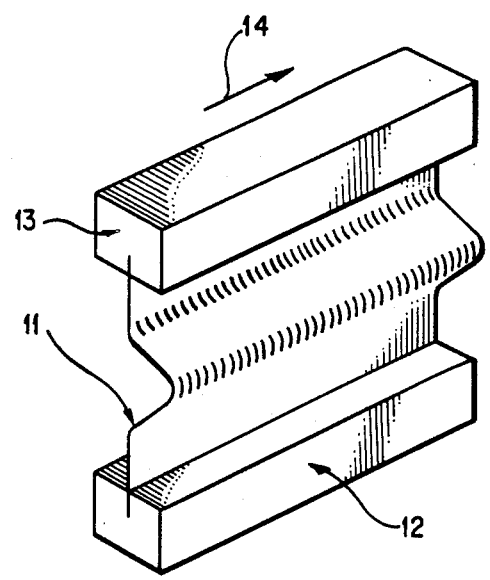
FIG. 1 is a schematic isometric of a membrane-type coupling.
Figure 2:
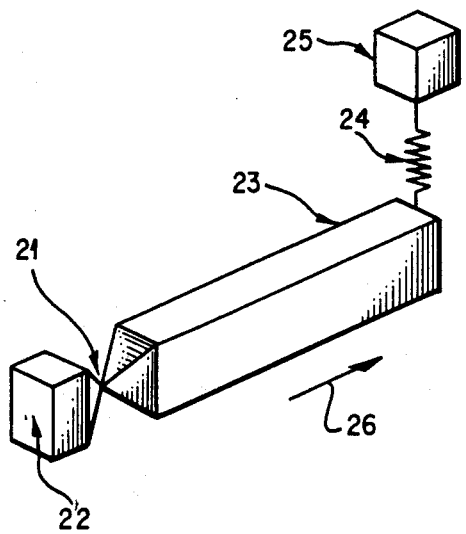
FIG. 2 is a schematic isometric of a beam-type coupling.
Figure 3:
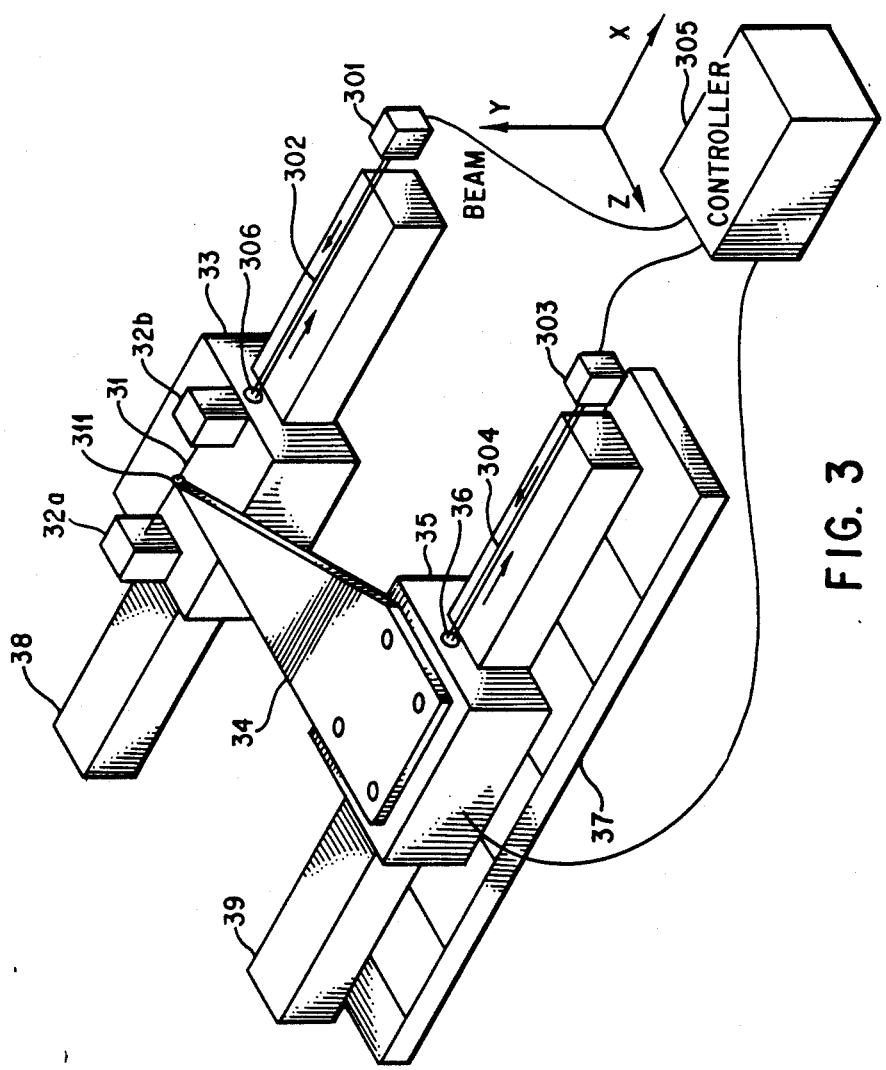
FIG. 3 is a schematic isometric of a preferred embodiment of the invention for ultra-precision motion applications such as instrument tables.

The wire-type embodiment is shown in FIG. 3 where the wire 31 is stretched between two posts 32a and 32b that are attached to the carriage 33, and the actuation force is applied to the wire 31 at point 311 via an outrigger device 34 which is attached to and is moved by an actuator comprising a slave carriage 35 and a linear electric motor 37 in the figure but may be a leadscrew or other type actuator. Linear measuring devices, shown as interferometers 303 and 301 in the figure, measure the axial position (along the x-axis) of both the slave carriage (the actuator) and the carriage the wire is attached to. One interferometer 301 measures the position of the carriage 33 by bouncing a laser beam 302 off a mirror 306 mounted on the carriage. Likewise, the other interferometer 303 measures the position of the slave carriage 35 by bouncing a laser beam 304 off a mirror 36 mounted on the slave carriage. The carriage 33 and slave carriage 35 are guided by bearings 38 and 39 respectively, both of which are parallel to the wire 31. The controller 305 receives position data from the interferometers 301 and 303 and controls the movement of the slave carriage 35. In this embodiment movement of the slave carriage 35 is controlled by altering the current through the motor winding in the slave carriage 35. The visible portion of the linear motion 37 consists of permanent magnets.

Figure 4:
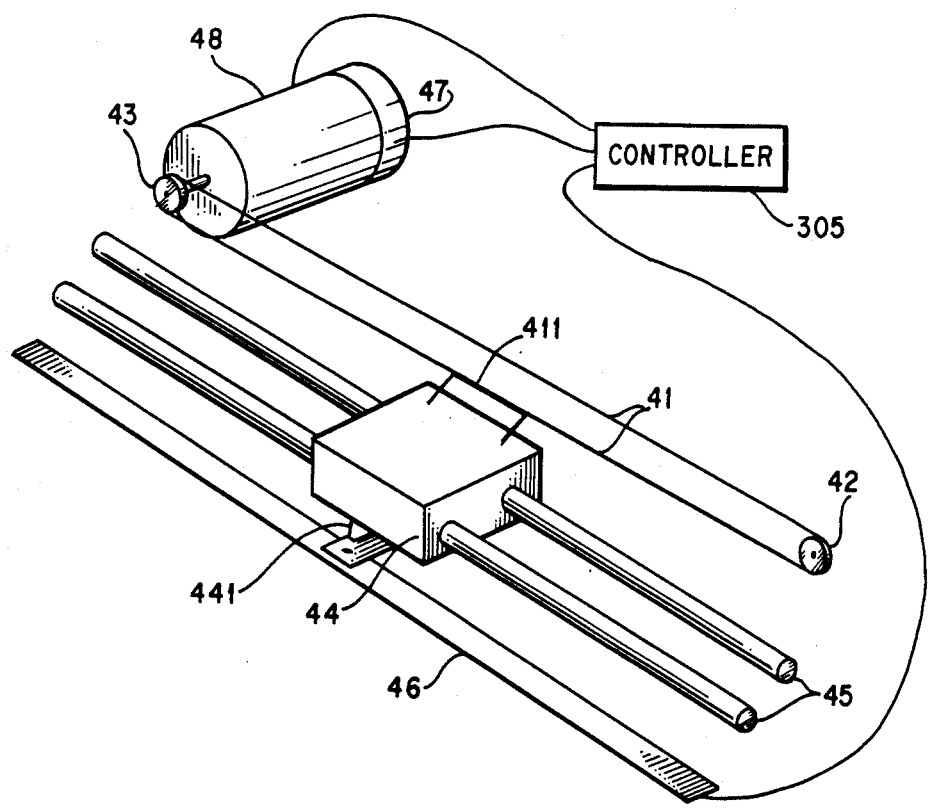
FIG. 4 is a schematic isometric of another preferred embodiment of the invention for high speed high accuracy motion applications such as printers.

The second preferred embodiment is shown in FIG. 4 where the wire 41 is a continuous loop wrapped around two pulleys 42 and 43 and the carriage 44 is attached to the wire at a point 411, one of the pulleys 43 being turned by a motor 48. A linear sensor 46 measures the position of the carriage 44 and a rotary sensor 47 measures the position of the drive pulley 43. The carriage slides along bearings 45. A printhead 441 is shown on the carriage 44. As with the FIG. 3 embodiment a controller 305 receives position data from sensors 46 and 47 and controls the position of the actuator; in this case, the actuator comprises the motor 48 and drive pulley 43.

The third preferred embodiment shows a pair of piezoelectric actuators 51 with grabbers, comprising clamps 52 and anvils 53, on their ends. Prior art had the piezoelectric actuator apparatus grab hold of a large diameter rigid rod and then pull it along incrementally, similar to the way an inchworm crawls. The problem is the rigid rod did not absorb lateral error forces like a wire can, and the control algorithm for the piezoelectric actuators used feedback from only a single sensor. Such a prior art device is manufactured, for example, by Burleigh Corp. and "Inchworm" is their registered trademark. In this embodiment, the actuators 51 can be attached to an immovable base 54. The actuators 51 can transmit forces to the wire 55, which is held taut by means of posts 56. The posts in turn are attached to a carriage or slide 57. Thus, the actuators 51 can transmit to the slide 51 forces that are axial to the wire 55, and the wire can absorb most lateral forces.

Figure 5:
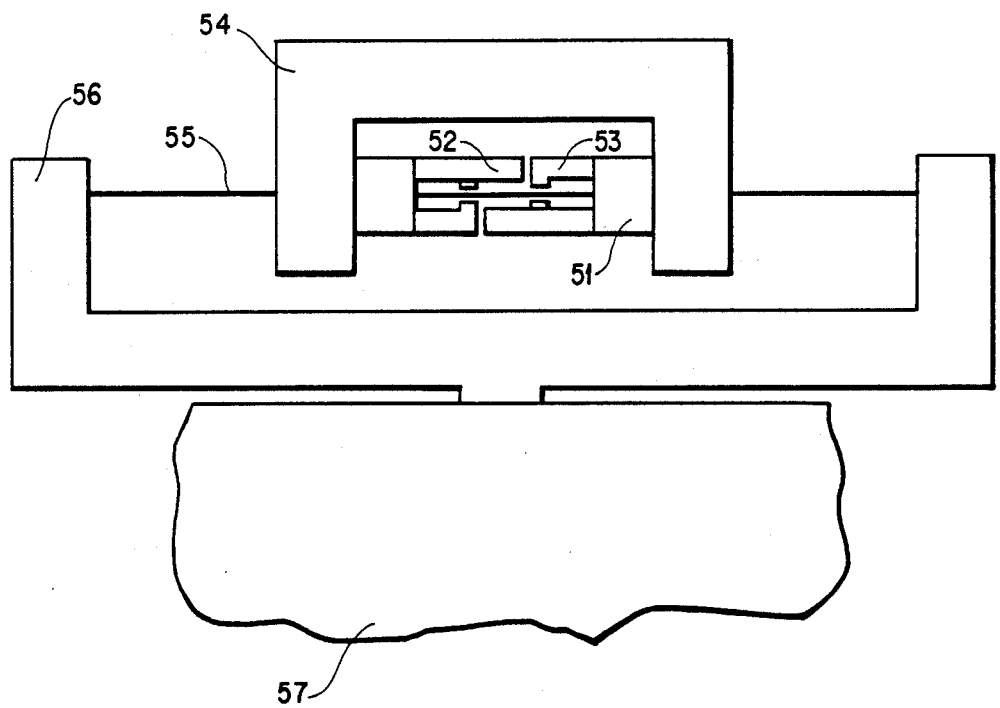
FIG. 5 is a schematic of another preferred embodiment of the invention where it is desired to use a piezoelectric Inchworm-type actuator.
Figure 6A:
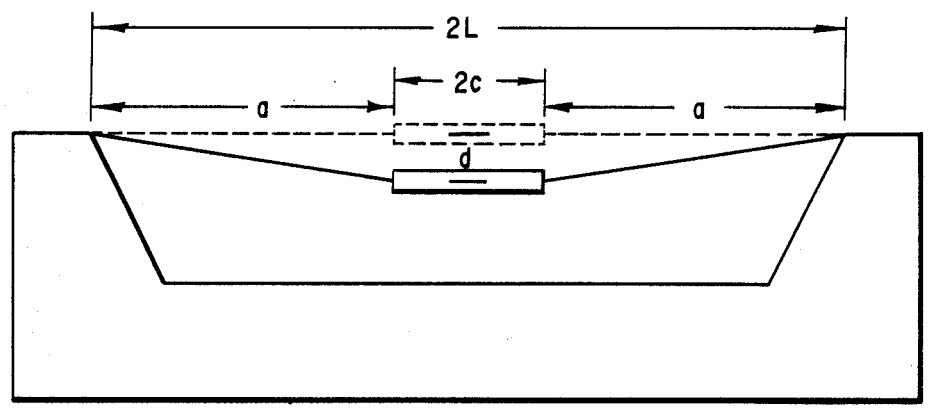
FIGS. 6a and 6b are schematics of the geometry of the wire used for calculating its coupling capability.

The amount of coupling action provided by the wire in FIGS. 3 and 5 can be calculated by reference to FIG. 6a as follows For a wire cross-sectional area A and wire length 2L, assuming the region of length 2c where the wire is grabbed is rigid with respect to the wire, the axial stiffness is $K_{axial} = AE/a$. As the wire is displaced laterally, forces are generated to resist this motion by the initial tension in the wire and the stretching of the wire. The change in tension caused by the wire stretching as it is deflected d laterally is:

$$\Delta T = EA\{(a+d^2/a^2)^{1/2} - 1\} \quad (1)$$

For an initial wire tension T and change in tension $\Delta T$ caused by lateral motion d of the wire, the resultant force on the end supports of the wire is:

$$F_{lateral} = 2(T + \Delta T) \sin G \approx 2(T + \Delta T)d/a \quad (2)$$

The effective lateral stiffness of the wire is found by substituting for $\Delta T$ in $F_{lateral}$ and taking the partial derivative with respect to d:

$$K_{lateral} = (2T + 2EAd^2/a^2)/a \quad (3)$$

When an axial force is applied, the tension on one side increases by the same amount it decreases on the other side. Thus the above is still a good approximation of the lateral stiffness in the presence of axial forces that do not reduce the tension on one side to zero.

Figure 6B:
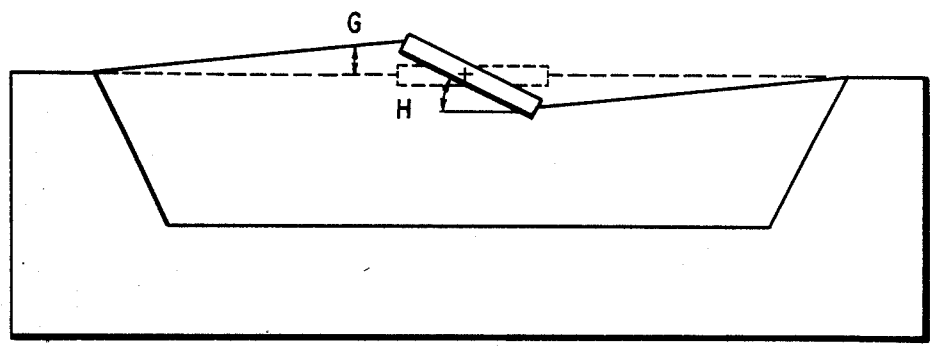

As shown in FIG. 6b, a rotational motion applied to the center of the wire about an axis orthogonal to its length causes the wire to be displaced in opposite directions on each side of the wire and hence causes a force couple at the ends of the wire. With the geometric parameters shown in FIG. 6, the elongation $\Delta a$ of the wire is found using the law of cosines to be:

$$\Delta a = \{c^2 + c(a - L \cos H)\}/a \quad (4)$$

The lateral force exerted by this segment of the wire on the attachment point is thus:

$$F_{lateral} = \{(c+a)H - LH \cos H\}c^2 EA/a^3 + TcH/a \quad (5)$$

The force is nonlinear, and hence the lateral force caused by an angular displacement is found from the partial derivative with respect to H of Equation 5:

$$K_{lateral-angular} = \{c + a - L \cos H + LH \sin H\}c^2 EA/a^3 + Tc/a \quad (6)$$

For small angles, it is essentially just $Tc/a$.

If the applied axial force is greater than the initial tension in the wire, then one side of the wire will become slack. Upon reversal of the force, the wire will have to be displaced by an amount equal to the slack generated and will thus behave like there is backlash in the system. Hence the initial tension must be carefully controlled. Too much tension and the lateral stiffnesses are too high. Too little tension and backlash occurs.

For an instrument with a positioning carriage (e.g. a scanning microscope) driven by a steel wire coupling, the following parameters may exist:
 Wire tension = 10N (2.25 lbf)
 Error motion = 100 μm (0.004")
 Length 2L = 11 cm, 2a = 10 cm (4")
 Wire diameter = 0.25 mm (0.010")
 $K_{lateral\ max}$ = 400.8 N/m (2.288 lbf/in)
 Resultant max. lateral force = 0.0400 N (0.0090 lbf)
 Slide stiffness = $10^8$ N/m (570,000 lbf/in)
 Resultant slide lateral error motion = 4 Angstroms
 $K_{axial}$ = 203 KN/m (1,160 lbf/in)

Even if the wire tension were increased by an order of magnitude, the lateral error motion would only be 40 Angstroms.

Figure 7A:
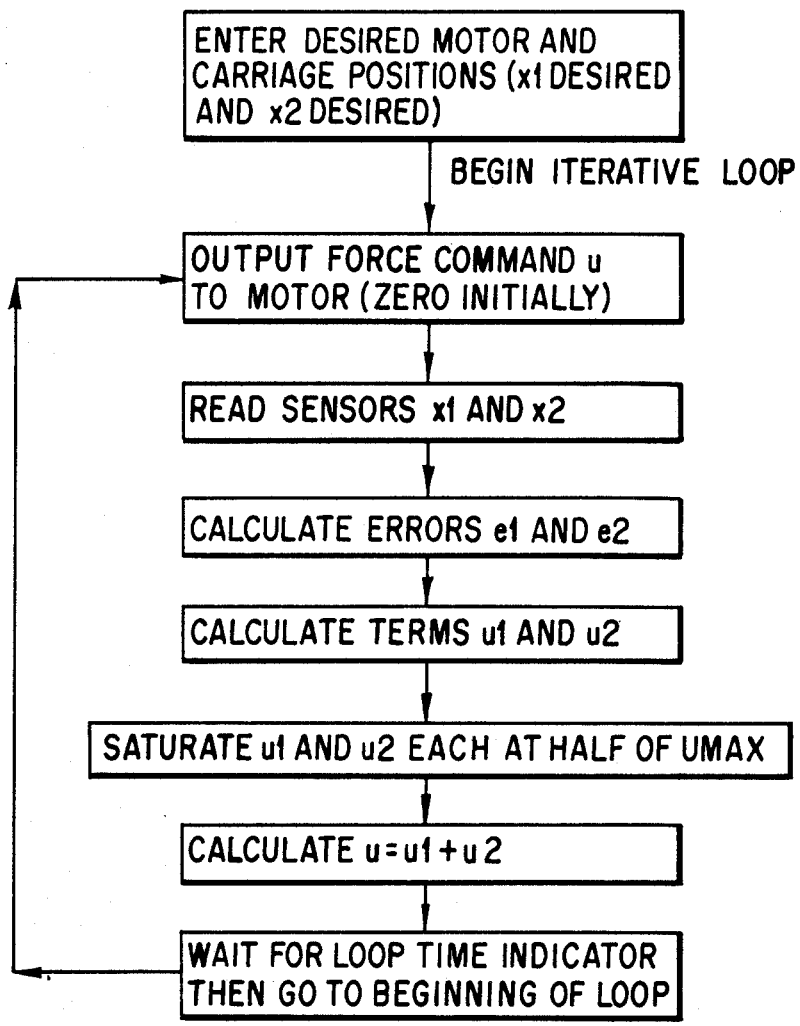
FIG. 7a is a flowchart of the control algorithm used to impart apparent high axial stiffness into the wire.

The algorithm shown in FIG. 7a can effectively increase the axial stiffness of any type flexural coupling through the use of added sensors and control software. The method requires the system to measure the position of the carriage at the points where the coupling is attached to the carriage and where the actuator is attached to the coupling The stretch of the coupling can then be determined and compensated for with the motion of the actuator if the latter has suitable bandwidth.

With the use of a flexible wire coupling, lateral errors from an actuator will be gently attenuated; however, the axial responsiveness of the carriage will also be greatly reduced. The physical analogy to this problem is using a flexible fishing rod to push a book across a table and stopping it at a desired point. If the observer cannot see how much the rod is bent, it is difficult to tell when to stop pushing. When the observer stops moving one end of the rod, the energy stored in the bent rod keeps pushing the book forward for a bit. The result is a classic limit cycling problem. With the use of a frictionless bearing, the friction component of limit cycling is removed, but the same overshoot problem remains. Only when the observer can see how much the rod is bending, can he more accurately tell when to stop pushing. FIG. 7a shows the flowchart for implementation of such an algorithm.

Much work has been done on control of flexible systems, but this work has primarily addressed control of structural mode shapes and not necessarily increasing resolution of precision system. Research on precision axial control of mechanical slides has focused on coarse/fine system. However, to decrease complexity and increase reliability, a method for controlling a single actuator/transmission/slide system is desired. Even if a fine motion stage is to be added, then the better the coarse motion stage can be controlled, the greater the accuracy of the combined coarse/fine system.

Figure 8:
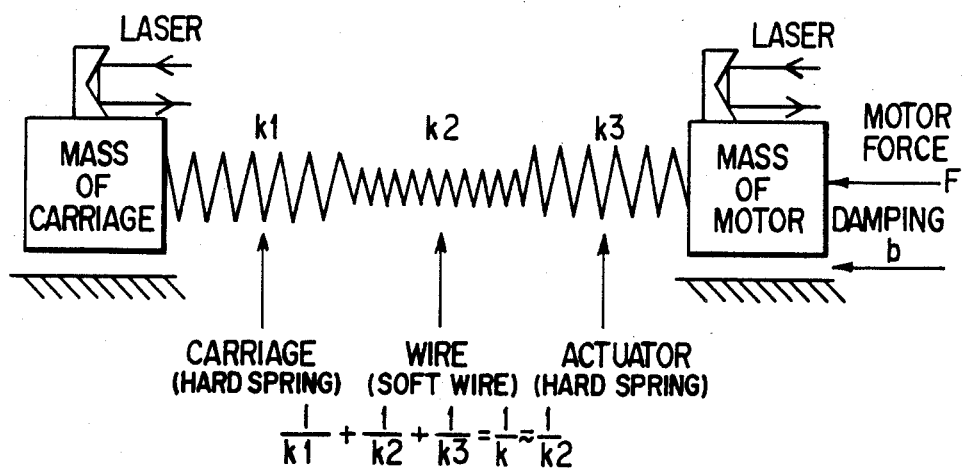
FIG. 8 is a schematic representing the dynamics of an actuator, flexural coupling, and carriage.

FIG. 8 shows a fourth order model of the actuator, wire coupling, and carriage. The actuator motor is modeled as a force source that acts on a mass dampened by friction. The wire transmission is the dominant spring which connects the actuator (motor), which is modeled as a mass and damper, to the carriage, which is also modeled as a mass and damper. The position of the slide cannot be controlled directly as the force exerted on the wire (and the slide) by the motor is unknown. The only way to accurately determine the force in the spring with a high resolution is to accurately measure the axial deflection of the spring (wire).

Since the force of the motor acting on the carriage (or slide) is unknown, current feedback of the motor cannot be used to determine the force being exerted on the carriage. Both the position of the carriage and the motor must be used, in combination with the spring length, to determine the force. When the carriage arrives at the desired point the motor must "jerk back" so that the wire spring is no longer compressed. Otherwise the force stored in the spring will cause the carriage to continue to move. The problem is determining how much to tell the motor to "jerk back" when the carriage stops moving.

It turns out that the "jerk" can be obtained by implementing a PID (proportional-integral-derivative) control law, or similar law known to those skilled in the art of closed loop position control, around the position feedback from the carriage and a second loop using the position feedback from the motor carriage. The outputs from the PIDs are then added and used as an input to the motor. Thus the system is a single input multiple output system. The logic used in arriving at this double PID algorithm is simple: If the distance between the actuator and carriage at rest is a stable constant, then after a move the distance must again be established, hence a closed loop algorithm around the position of the carriage and the motor can be used so the difference between the two will be the equilibrium separation.

For example, where x1desired and x2desired are the desired positions of the actuator and carriage, x1 and x2 are the positions of the carriage and actuator, umax is the maximum force command to the actuator, and u is the control force command that will be output to the motor, a section of the digital servo algorithm would look like:

```
Input desired positions x1desired and x2desired
Begin loop
1 Output u to digital-to-analog converter
  Read sensors' positions x1 and x2
  e1 = x1desired − x1
  e2 = x2desired − x2
  u1 = a11*e1 + a12*e1old1 + a13*e1old2 +
       a14*u1old1 + a15*u1old2
  IF (u1 > umax/2) THEN u1 = umax/2
  u2 = a21*e2 + a22*e2old1 + a23*2old2 +
       a24*u2old1 + a25*u2old2
  IF (u2 > umax/2) THEN u2 = umax/2
  e1old2 = e1old1
  e1old1 = e1
  e2old2 = e2old1
  e2old1 = e2
  u1old2 = u1old1
  u1old1 = u1
  u2old2 = u2old1
  u2old1 = u2
  u = u1 + u2
  Wait for timing, then GOTO 1 and output control force
  u to actuator
```

Figure 7B:
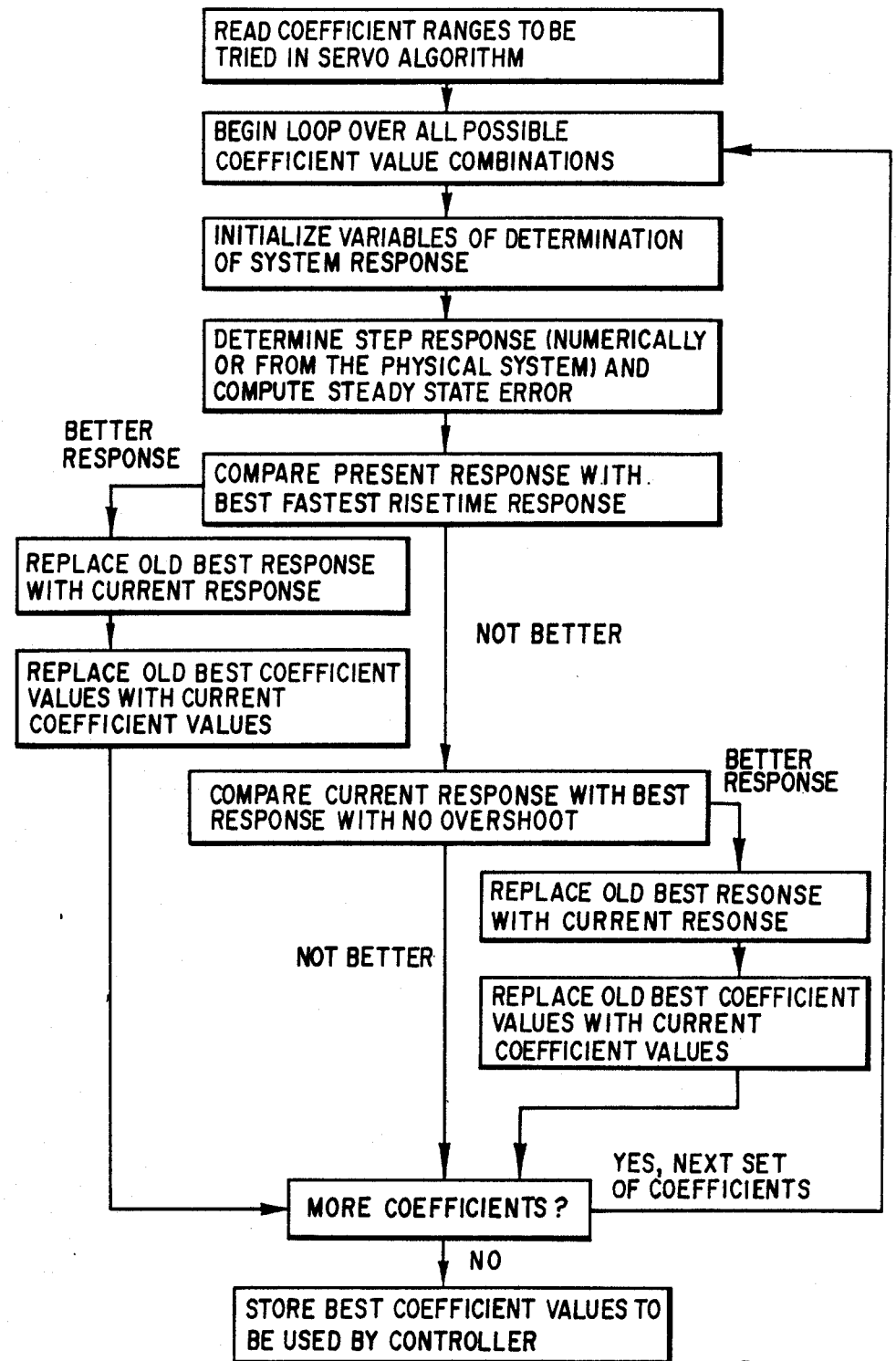
FIG. 7b is a flowchart of the algorithm used to search for the coefficients for use in the FIG. 7a algorithm.

The expressions for $u_1$ and $u_2$ are the general format for a recursive control algorithm that is typically made a PID algorithm through appropriate selection of the constants $a_{11}, a_{12}$... which is known to those skilled in the art who are familiar with pole-zero placement for control systems. FIG. 7b shows an algorithm for searching for these coefficients.

Prior art would calculate only u1, let it saturate at umax, and then use it as the control force to the actuator:

```
Input desired position of carriage xdesired
Begin loop
1 Output u to digital analog converter
  Read sensor positions x
  e = xdesired − x
  u = a1*e1 + a2*eold1 + a3*eold2 +
      a4*uold1 + a5*uold2
  IF (u > umax) THEN u = umax
  eold2 = eold1
  eold1 = e
  uold2 = uold1
  uold1 = u
  Wait for timing, then GOTO 1 and output control force
  u to actuator
```

Figure 9:
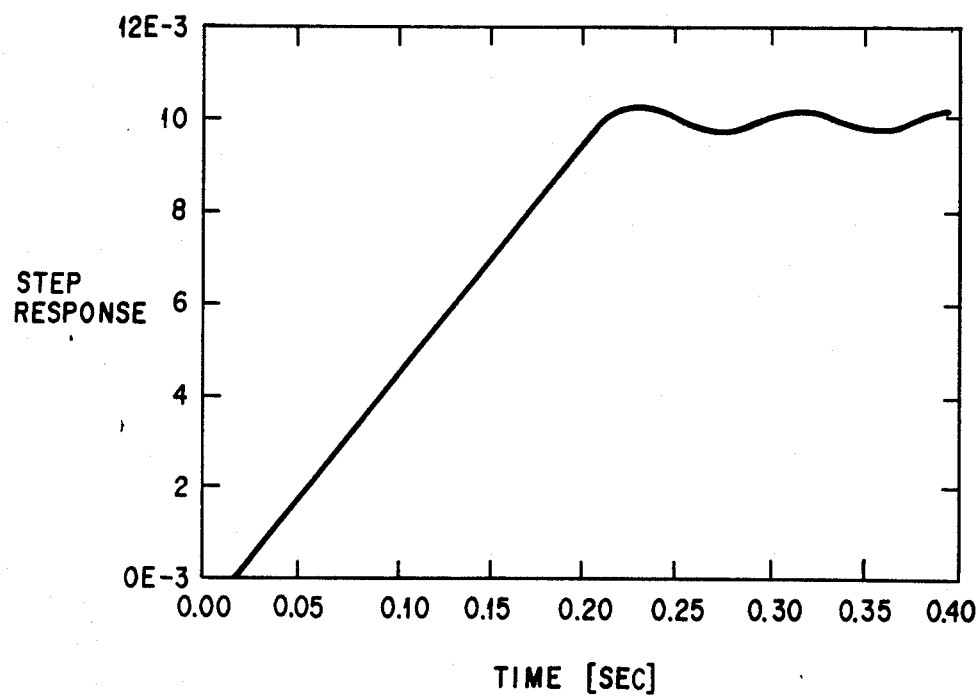
FIG. 9 shows the response of a system using a prior art control method.
Figure 10:
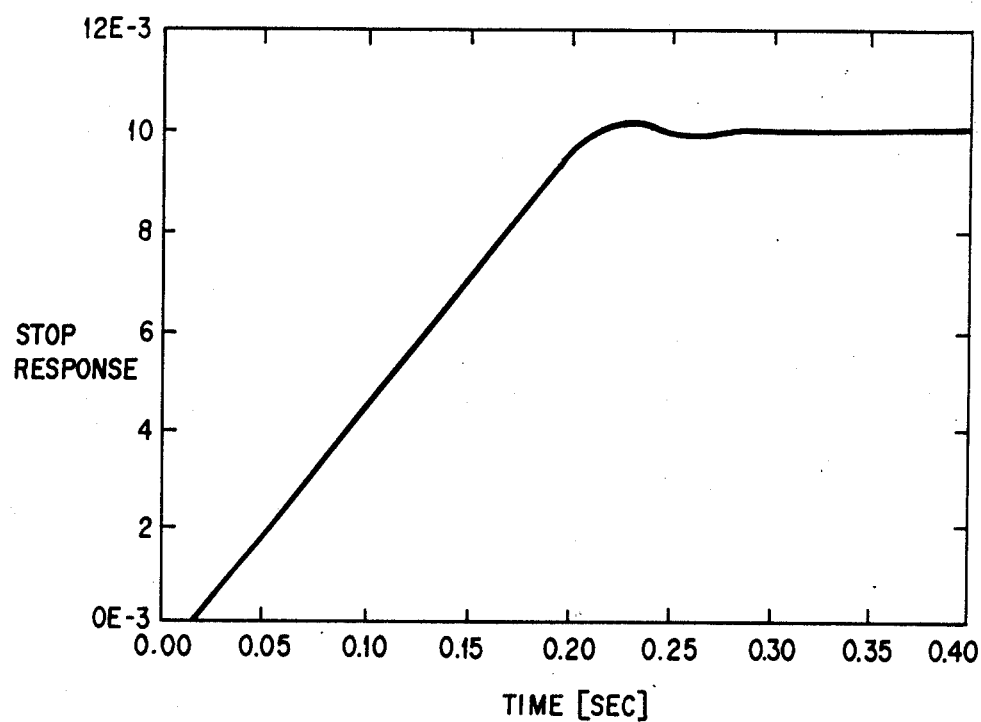

The prior art, however, illicits oscillatory response from the system as shown in FIG. 9. By saturating the control forces u1 and u2 at one half of the allowable maximum and then sending their sum to the actuator, one guarantees a rapid convergence to the minimum energy state as shown in FIG. 10.

The principal point here is that the position of the motor and the carriage must both be measured and used in the digital controller difference equations.

The equations of motion for the system shown in FIG. 8 are:

$$m_1 X_1'' + k(X_1 - X_2) = F - b_1 X_1' \quad (8a)$$

$$m_2 X_2'' + k(X_2 - X_1) = -b_2 X_2' \quad (8b)$$

For this model the system has a single input, the motor force, and single output, the position of the carriage. In FIGS. 9 and 10, the carriage and motor masses are assumed to be $m_1 = 2$ kg and $m_2 = 5$ kg. It is assumed that the wire coupling described in the above example is used. The damping effects are assumed to be linear and uncoupled for this model. The viscous damping $b_i$ is calculated assuming a damping coefficient of 0.7 and as if each mass were attached to a wall by a spring instead of to each other. (A damping coefficient 0.7 represents an underdamped system with relatively fast response time and no overshoot. This would be realized in a magnetic bearing system with viscous (oil tub) damping or with a platten supported by sliding bearing pads.)

The simulated step responses of the carriage with prior art control algorithms and the new algorithm are shown respectively in FIGS. 9 and 10 which show the dramatic improvement obtained with the use of the PIDPID control algorithm.

Figure 11:
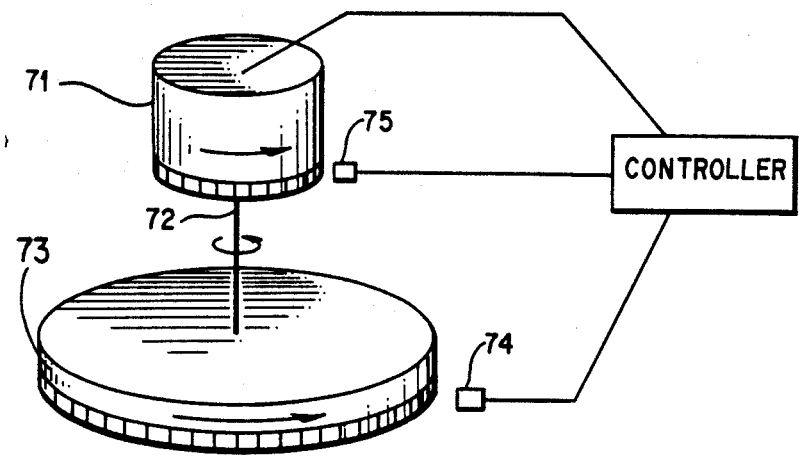
FIG. 11 depicts a rotary motion application of the invention.

A rotary motion application of the invention is depicted in FIG. 11. The carriage 73 is suspended by means of a wire 72 or other suitable coupling, from the actuator 71. The actuator 71 rotates providing a torque that causes the wire 72 to twist. Thus a torque is transmitted through the wire 72 to the carriage 73. Encoders 74 and 75 measure the angular displacement of the carriage 73 and actuator 71 respectively. A controller receives the position data from the encoders and controls the position of the actuator 71.

What is claimed is:

1. A device for supporting and moving an item to a desired position, comprising:
   carriage means for holding the item;
   actuator means for applying a force to move the carriage means;
   flexural coupling means for transmitting the force from the actuator means to the carriage means;

carriage sensing means for measuring the position of the carriage means and generating carriage position data;

actuator sensing mans for measuring the position of the actuator means and generating actuator position data; and control means for receiving carriage position data from the carriage sensing means and actuator position data from the actuator sensing means and for controlling the actuator means such that the actuator means applies a force the strength of which is a function of the carriage position data, the actuator position data and the desired position.

2. A device according to claim 1, wherein the actuator means has a final position, hereinafter referred to as "actuator final position," corresponding to the desired final position of the item, hereinafter referred to as "item final position," and the control means controls the actuator means such that the actuator means applies a force the strength of which is a function of the differences between the carriage position data and the item final position, and between the actuator position data and the actuator final position.

3. A device according to claim 1, wherein the flexural coupling means includes a wire that is taut enough to prevent backlash, but loose enough to absorb a substantial portion of lateral forces on the carriage means.

4. A device according to claim 3, wherein
the wire is attached at two points to the carriage means such that the wire is straight; and
the actuator means is attached to the wire at a third point between the two points.

5. A device according to claim 1, wherein
the actuator means includes a first pulley wheel and a motor to turn the first pulley wheel;
a wire is an endless loop strung around the first pulley wheel and a second pulley wheel;
the carriage means is attached to the wire between the first and second pulley wheels such that when the first pulley wheel is turned the carriage means is moved in a direction parallel to the wire; and
the actuator sensing means includes means for measuring the angular position of the first pulley wheel.

6. A device according to claim 1, wherein the actuator applies a force in one direction and then in a directly opposite direction in order to bring the item to the desired position.

7. A device for supporting and moving an item, comprising:
carriage means for holding the item;
actuator means for applying a force to move the carriage means;
flexural coupling means for transmitting the force from the actuator means to the carriage means;
carriage sensing means for measuring the position of the carriage means;
actuator sensing means for measuring the position of the actuator means; and
control means for receiving data from the carriage sensing means and the actuator sensing means and for controlling the actuator means such that the carriage is moved quickly and accurately to a desired position
wherein the actuator means and the carriage means have desired positions corresponding to the desired position of the item, and wherein the control means controls the actuator means by generating signals, referred to as control force commands, indicating how much force is to be applied by the actuator means, the signal corresponding to the largest force that the actuator means is capable of applying being called a maximum force command, and calculate each control force command by repeating the following steps using variables $x1$, $x2$, $x1desired$, $x2desired$, $u1$, $u1old1$, $u1old2$, $u2$, $u2old1$, $u2old2$, $e1$, $e1old1$, $e1old2$, $e2$, $e2old1$, $e2old2$, $a11$, $a12$, $a13$, $a14$, $a15$, $a21$, $a22$, $a23$, $a24$ and $a25$, in a series of iterations, including a first iteration and subsequent iterations, each subsequent iteration having a previous iteration, until the carriage means and the actuator means reach their desired positions:

(a) determining $e1$ by subtracting $x1$, which represents the current position of the carriage means, from $x1desired$, which represents the desired position of the carriage means;

(b) determining $e2$ by subtracting $x2$, which represents the current position of the actuator means, from $x2desired$, which represents the desired position of the actuator means;

(c) determining $u1$ by finding the sum of the products: ($a11*e1$), ($a12*e1old1$), ($a13*e1old2$), ($a14*u1old1$), and ($a15*u1old2$), wherein $a11$, $a12$, $a13$, $a14$ and $a15$ are coefficients for a recursive digital control algorithm, and wherein $e1old2$ equals zero for the first iteration and $e1old1$ of the previsous iteration for subsequent iterations, $e1old1$ equals zero for the first iteration and $e1$ of the previous iteration for subsequent iterations, $e1old2$ equals zero for the first iteration and $e1old1$ of the previous iteration for subsequent iterations, and $u1old1$ equals zero for the first iteration and $u1$ of the previous iteration for subsequent iterations;

(d) reducing $u1$ to one-half of the maximum force command if the $u1$ calculated in step (c) is greater than one-half of the maximum force command;

(e) determining $u2$ by finding the sum of the products: ($a21*e2$), ($a22*e2old1$), ($a23*e2old2$) ($a24*u2old1$), and a ($25*u2old$), wherein $a21$, $a22$, $a23$, $a24$ and $a25$ are coefficients for a recursive digital control algorithm, and wherein $e2old2$ equals zero for the first iteration and $e2old1$ of the previous iteration for subsequent iterations, $e2old1$ equals zero for the first iteration and $e2$ of the previous iteration for subsequent iterations, $u2old2$ equals zero for the first iteration and $u2old1$ of the previous iteration for subsequent iterations, and $u2old1$ equals zero for the first iteration and $u2$ of the previous iteration for subsequent iteration;

(f) reducing $u2$ to one-half of the maximum force command if the $u2$ calculated in step (e) is greater than one-half of the maximum force command; and (g) determining the control force command by adding $u1$ and $u2$.

8. A device according to claim 7, wherein the flexural coupling means includes a wire that is taut enough to prevent backlash, but loose enough to absorb a substantial portion of lateral forces on the carriage means.

9. A device according to claim 7, wherein
the actuator means includes a first pulley wheel and a motor to turn the first pulley wheel;
a wire is an endless loop strung around the first pulley wheel and a second pulley wheel;
the carriage means is attached to the wire between the first and second pulley wheels such that when the first pulley wheel is turned the carriage means is moved in a direction parallel to the wire; and the actuator sensing means includes means for measuring the angular position of the first pulley wheel.

10. A device for moving an item, comprising:

actuator means for applying a force to move the item;

flexural transmission means for transmitting the force from the actuator means to the item;

item sensor means for measuring the position of the item;

actuator sensor means for measuring the position of the actuator means; and control means for receiving data from the item sensor means and the actuator sensor means and for controlling the actuator means such that the item is moved quickly and accurately to a desired position, wherein the actuator means has a desired position corresponding to the desired position of the item, and wherein the control means controls the actuator means by generating signals, referred to as control force commands, indicating how much force is to be applied by the actuator means, the signal corresponding to the largest force that the actuator means is capable of applying being called a maximum force command, and calculates each control force command by repeating the following steps using variables x1, x2, x1desired, x2desired, u1, u1old1, u1old2, u2, u2old1, u2old2, e1, e1old1, e1old2, e2, e2old1, e2old2, a11, a12, a13, a14, a15, a21, a22, a23, a24 and a25, in a series of iterations, including a first iteration and subsequent iterations, each subsequent iteration having a previous iteration, until the item and the actuator means reach their desired positions:

(a) determining e1 by subtracting x1, which represents the current position of the item, from x1desired, which represents the desired position of the item;

(b) determining e2 by subtracting x2, which represents the current position of the actuator means, from x2desired, which represents the desired position of the actuator means;

(c) determining u1 by finding the sum of the products: (a11*e1), (a12*e1old1), (a13*e1old2), (a14*u1old1), and (a15*u1old2), wherein a11, a12, a13, a14 and a15 are coefficients for a recursive digital control algorithm, and wherein e1old2 equals zero for the first iteration and e1old1 of the previous iteration for subsequent iterations, e1old1 equals zero for the first iteration and e1 of the previous iteration for subsequent iterations, u1old2 equals zero for the first iteration and u1old1 of the previous iteration for subsequent iterations, and u1old1 equals zero for the first iteration and u1 of the previous iteration for subsequent iterations;

(d) reducing u1 to one-half of the maximum force command if the u1 calculated in step (c) is greater than one-half of the maximum force command;

(e) determining u2 by finding the sum of the products: (a21*a2), (a22*e2old1), (a23*e2old2) (a24*u2old1), and (a25*u2old2), wherein a21, a22, a23, a24 and a25 are coefficients for a recursive digital control algorithm, and wherein e2old2 equals zero for the first iteration and e2old1 of the previous iteration for subsequent iterations, e2old1 equals zero for the first iteration and e2 of the previous iteration subsequent iterations, u2old2 equals zero for the first iteration and u2old1 of the previous iteration for subsequent iterations, and u2old1 equals zero for the first iteration and u2 of the previous iteration for subsequent iteration;

(f) reducing u2 to one-half of the maximum force command if the u2 calculated in step (e) is greater than one-half of the maximum force command; and (g) determining the control force command by adding u1 and u2.

11. A system for controlling the movement of an item to a desired position by an actuator that applies force to the item through a flexural transmission, the system comprising:

item sensor means for measuring the position of the item and generating item position data;

actuator sensor means for measuring the position of the actuator and generating actuator position data; and control means for receiving item position data from the item sensor means and actuator position data from the actuator sensor means and for controlling the actuator such that the actuator means applies a force the strength of which is a function of the item position data, the actuator position data and the desired position.

12. A device according to claim 11, wherein the actuator means has a final position, hereinafter referred to as "actuator final position," corresponding to the desired final position of the item, hereinafter referred to as "item final position," and the control means controls the actuator means such that the actuator means applies a force the strength of which is a function of the differences between the item position data and the item final position, and between the actuator position data and the actuator final position.

13. A device according to claim 11, wherein the actuator applies a force in one direction and then in a directly opposite direction in order to bring the item to the desired position.

14. A device for moving an item to a desired position, comprising:

actuator means for applying a force to move the item;

flexural transmission means for transmitting the force from the actuator means to the item;

item sensor means for measuring the position of the item and generating item position data;

actuator sensor means for measuring the position of the actuator means and generating actuator position data; and control means for receiving item position data from the item sensor means and actuator position data from the actuator sensor means and for controlling the actuator means such that the actuator means applies a force the strength of which is a function of the item position data, the actuator position data and the desired position.

15. A device according to claim 14, wherein, the actuator means ha a final position, hereinafter referred to as "actuator final position," corresponding to the desired final position of the item, hereinafter referred to as "item final position," and the control means controls the actuator means such that the actuator means applies a force the strength of which is a function of the differences between the item position data and the item final position, and between the actuator position data and the actuator final position.

16. A device according to claim 14, wherein the actuator applies a force in one direction and then in a directly opposite direction in order to bring the item to the desired position.

17. A device for supporting and moving an item, comprising:
   carriage means for holding an item;
   a wire attached to the carriage means at first and second points such that the wire is substantially straight and is taut enough to prevent backlash, but is loose enough to absorb a substantial portion of lateral forces on the carriage means;
   actuator means for applying a force to the wire at a third point between the first and second points such that the carriage means moves in a direction substantially parallel to the wire;
   sensing means for measuring the position of the carriage means; and
   control means for receiving data from the sensing means and for controlling the actuator means.

18. A device for accurately and efficiently controlling the movement of an item by an actuator that applies force to the item through a flexural transmission, the system comprising:
   item sensor means for measuring the position of the item;
   actuator sensor means for measuring the position of the actuator; and
   control means for receiving data from the item sensor means and the actuator sensor means and for controlling the actuator such that the item is moved quickly and accurately to a desired position,
   wherein the actuator means has a desired position corresponding to the desired position of the item, and wherein the control means controls the actuator means by generating signals, referred to as control force commands, indicating how much force is to be applied by the actuator means, the signal corresponding to the largest force that the actuator means is capable of applying being called a maximum force command, and calculates each control force command by repeating the following steps using variables x1, x2, x1desired, x2desired, u1, u1old1, u1old2, u2, u2old1, u2old2, e1, e1old1, e1old2, e2, e2old1, e2old2, a11, a12, a13, a14, a15, a21, a22, a23, a24 and a25 in a series of iterations, including a first iteration and subsequent iterations, each subsequent iteration having a previous iteration, until the item and the actuator means reach their desired positions:
   (a) determining e1 by subtracting x1, which represents the current position of the item, from x1desired, which represents the desired position of the item;
   (b) determining e2 by subtracting x2, which represents the current position of the actuator mans, from x2desired, which represents the desired position of the actuator means;
   (c) determining u1 by finding the sum of the products: (a11*e1), (a12*e1old1), (a13*e1old2), (a14*u1old1), and (a15*u1old2), wherein a11, a12, a13, a14 and a15 are coefficients for a recursive digital control algorithm, and wherein e1old2 equals zero for the first iteration and e1old1 of the previous iteration for subsequent iterations, e1old1 equals zero for the first iteration and e1 of the previous iteration for subsequent iterations, u1old2 equals zero for the first iteration and u1old1 of the previous iteration for subsequent iterations, and u1old1 equals zero for the first iteration and u1 of the previous iteration for subsequent iterations;
   (d) reducing u1 to one-half of the maximum force command if the u1 calculated in step (c) is greater than one-half of the maximum force command;
   (e) determining u2 by finding the sum of the products: (a21*e2), (a22*e2old1), (a22*e2old2) (a24*u2old1), and (a25*u2old2), wherein a21, a22, a23, a24 and a25 are coefficients for recursive digital control algorithm, and wherein e2old2 equals zero for the first iteration and e2old1 of the previous iteration for subsequent iterations, e2old1 equals zero for the first iteration and e2 of the previous iteration for subsequent iterations, u2old2 equals zero for the first iteration and u2old1 of the previous iteration for subsequent iterations, and u2old1 equals zero for the first iteration and u2 of the previous iteration for subsequent iteration;
   (f) reducing u2 to one-half of the maximum force command if the u2 calculated in step (e) is greater than one-half of the maximum force command; and
   (g) determining the control force command by adding u1 and u2.

19. A method for moving an item to a desired position, comprising:
   applying a force of variable strength to move the item by means of an actuator;
   transmitting the force from the actuator to the item by means of a flexural coupler;
   measuring the position of the item and generating item position data;
   measuring the position of the actuator means and generating actuator position data; and
   controlling the actuator such that the strength of the force is a function of the item position data, the actuator position data and the desired position of the item.

20. A method according to claim 19, wherein the actuator has a final position, hereinafter referred to as "actuator final position," corresponding to the desired final position of the item, hereinafter referred to as "item final position," and the strength of force is a function of the differences between the item position data and the item final position, and between the actuator position data and the actuator final position.

21. A method according to claim 19, wherein the force is applied in one direction and then in a directly opposite direction.

* * * * *